United States Patent [19]

Fischer et al.

[11] Patent Number: 4,498,842
[45] Date of Patent: Feb. 12, 1985

[54] APPARATUS FOR ADJUSTING THE TRACK OF ROTOR BLADES THROUGH REMOTE CONTROL

[75] Inventors: Willy G. Fischer, Ahnatal; Elmar Thom, Warburg, both of Fed. Rep. of Germany

[73] Assignee: Henschel Flugzeug-Werke AG, Kassel, Fed. Rep. of Germany

[21] Appl. No.: 511,319

[22] Filed: Jul. 6, 1983

[30] Foreign Application Priority Data

Jul. 8, 1982 [DE] Fed. Rep. of Germany ....... 3225571

[51] Int. Cl.³ .................. B64C 11/44; B64C 27/68
[52] U.S. Cl. ................................ 416/155; 416/61; 416/168 R
[58] Field of Search ............... 416/155, 158, 168, 61, 416/153

[56] References Cited

U.S. PATENT DOCUMENTS

| | | | |
|---|---|---|---|
| 2,970,367 | 2/1961 | Crump | 416/61 X |
| 3,008,525 | 11/1961 | Jensen | 416/61 |
| 3,415,324 | 12/1968 | Austin | 416/61 |
| 3,515,485 | 6/1970 | Frank | 416/61 X |
| 3,524,354 | 8/1970 | Frank et al. | 416/61 X |
| 3,736,010 | 5/1973 | Larkin | 416/61 X |

FOREIGN PATENT DOCUMENTS 2757617 6/1979 Fed. Rep. of Germany ........ 416/61

Primary Examiner—Everette A. Powell, Jr.
Attorney, Agent, or Firm—Becker & Becker, Inc.

[57] ABSTRACT

An apparatus for adjusting the track of rotor blades through remote control, especially of a helicopter during flight. Each rotor blade has a two-part, lengthwise adjustable control rod with a servomotor which is associated with the supply unit for rotor blade control. A receiving/transmitting part is provided, and a control device (potentiometer) as well as a measuring device are installed in the control rod and are operatively connected with an operating station having an indicator or monitor. The receiving/transmitting part, and the energy source of the servomotor associated with the supply unit for rotor blade control, are integrated in the control rod and are combined with the servomotor to a structural unit and are accommodated in a common housing.

2 Claims, 3 Drawing Figures

APPARATUS FOR ADJUSTING THE TRACK OF ROTOR BLADES THROUGH REMOTE CONTROL

BACKGROUND OF THE INVENTION

The present invention relates to an apparatus for adjusting or setting the track of rotor blades through remote control, especially for a helicopter during flight. Each rotor blade has a two-part, lengthwise adjustable control rod with a servomotor which is associated with the supply unit for rotor blade control. A receiving/transmitting device is provided, and in the control rod a control device (potentiometer) as well as a measuring device are installed which are operatively connected with an operating station which is provided with an indicator or monitor.

Prior to mounting the rotor blades on the helicopter, the blades, which rotate with the rotor hub, are checked in a simulated hovering flight on a rigid test stand which is firmly located on the ground. In so doing, using a stroboscopic method, the blade track is measured, and each rotor blade is optimally adjusted by means of a lengthwise adjustable control rod in conformity with the test readings.

However, during forward flight of the helicopter, aerodynamic forces act on the rotor blades and bring them out of track, as a result of which vibrations occur in the blade operating cycle which are transmitted to the entire helicopter. In order to stop these undesired vibrations, and to adjust the rotor blades to another track, the helicopter must be landed and when the rotor has stopped the control rod of one rotor blade at a time must manually be either lengthened or shortened. The helicopter can then resume flight. This process must be repeated until an optimum vibration behavior of the helicopter during flight is achieved; i.e. the length of all of the control rods of the rotor blades have been correctly adjusted.

In an apparatus of the aforementioned general type (German Patent No. 27 57 617), the supply unit for rotor blade control is arranged on the rotatable rotor hub. The source of energy, which is located in this unit and is a part of the drive system, is connected by means of lines, which extend externally of the control rod, with the servomotor which is accommodated in the control rod. The receiving/transmitting device for transmitting signals, such as control signals and measured values of the tensile and compressive forces which occur in the control rod, is also located on the rotatable rotor hub. Such an arrangement of the supply unit and of the receiving/transmitting device on the rotor hub cannot be utilized with all types of helicopters, because the possibility for mounting is not always present. Furthermore, the lines, which are located externally of the control rod between the servomotor and the supply unit, can be easily damaged or can produce an imbalance, thereby having an unfavorable effect on the adjustment operations.

The main object of the present invention consists in substantially further developing an apparatus for adjusting the tracking of rotor blades of the aforementioned general type in such a way that the spatial separation of the receiving/transmitting device, the source of energy which is located in the supply unit and the servomotor, which is arranged externally of this unit, is eliminated and their connections are at the same time simplified.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 2:
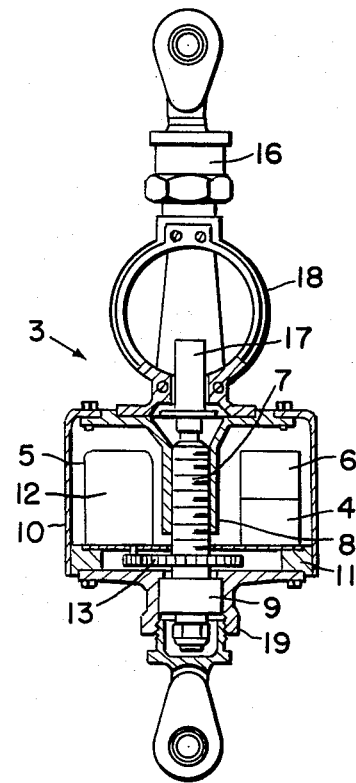
FIG. 2 is a partial longitudinal central section on a larger scale of a lengthwise adjustable control rod of one embodiment of the inventive apparatus.

The apparatus of the present invention is characterized primarily in that the parts of the supply unit for rotor blade control, namely the source of energy of the servomotor, and the receiving/transmitting part, are integrated in the control rod and are combined with the servomotor into a structural unit and are accommodated in a common housing.

The advantages obtained with the present invention are based in particular on the fact that the control rod with the integrated structural components is functional by itself and can be subsequently installed into any helicopter without significant modification.

Pursuant to a particularly preferred embodiment of the present invention, the source of energy and the receiving/transmitting part can be mounted on the support plate for the servomotor; this support plate can be axialy displaced, and closes off one end of the housing.

Utilization of the inventive apparatus on a helicopter allows adjustment of the rotor blade by the copilot from the cockpit or control room by means of the controls at the control unit independent of the actual control of the flight. The adjustment of the rotor blades is effected from a zero setting on the control unit. This adjusting can be optimally carried out not only based on acoustic or optical signals at the control unit, but also based on vibrations of the helicopter felt by the pilot. The inventive control rod with the integrated structural components used for adjusting the track can, after conclusion of the adjustment process, i.e. after achieving the optimum flight behavior, either remain on the helicopter or be removed and replaced by another simple pitch change link, for example one inherent to the helicopter. The length of this pitch change link which is to be installed must, however, prior to its installation be set in conformity to the length of the control rod which was removed.

DESCRIPTION OF A PREFERRED EMBODIMENT

Referring now to the drawing in detail, for the remote control for adjusting or setting the track of the rotor blade 1, a control unit 2 which has non-illustrated operating and control devices is shown in the cockpit or control room of the helicopter. Each rotor blade 1 is provided with a two-part control rod 3 which can be adjusted with regard to its length, and which is mounted in a known manner. A plurality of structural components which are part of the supply unit for rotor blade control is arranged in the control rod 3. The adjustment of the length of the control rod 3 mounted on the helicopter, and the control of the control forces, is effected from or at the control unit 2 in the cockpit of the helicopter.

Figure 3:
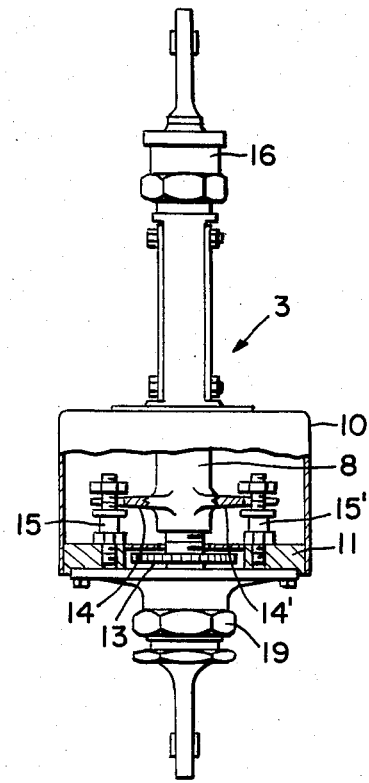
FIG. 3 shows a partially cut-away and sectioned side view of the control rod of FIG. 2.
Figure 1:
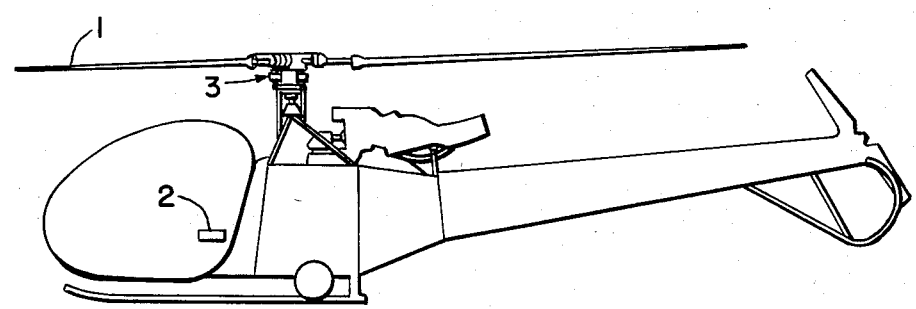
FIG. 1 is a side view of the inventive apparatus on a helicopter.

As shown in FIGS. 2 and 3, each lengthwise-adjustable, two-part control rod 3 has its own drive system, which essentially comprises a source of energy 4, which can be electrical, hydraulic, or pneumatic, a servomotor 5, and a receiving/transmitting part 6. One end of the portions of the control rod which face one another is provided with a rotatable, fixed threaded spindle 7 which cooperates with a non-rotatable spindle nut 8 at the other end of the portion of the control rod. A housing 10 having a support plate 11 at the front end serves to accommodate the rod end connection of threaded spindle 7 and spindle nut 8 in a protected manner. The support plate 11 can be axially displaced in the housing 10. The source of energy 4, the servomotor 5, and the receiving/transmitting part 6 can also be disposed in a protected manner on that side of the support plate 11 which faces the housing 10. A potentiometer (not illustrated) is also mounted in the housing 10. The threaded spindle 7 is mounted in an extension 19 of the support plate 11 by means of a roller bearing 9, and is operatively connected by means of a pair of spur gears 13 with the servomotor, which is disposed in the housing 10 and in the illustrated embodiment, is an electromotor 12. A mounting eye (not referred to in greater detail) of the control rod 3 is connected to the extension 19 of the support plate 11.

The rotary motion necessary for adjusting the length of the control rod 3 is transmitted from the electromotor 12 via the pair of spur gears 13 to the threaded spindle 7. By means of a pair of forked arms 14 and 14', and a pair of guide pins 15 and 15', which at the same time serve as a limitation of the adjusting path, the spindle nut 8 is arranged in the housing 10 in such a way that it is non-rotatable yet can be axially displaced. Externally of the housing 10, the spindle nut 8 has a part 16 on which is disposed the other mounting eye for the control rod 3. A signal coil is designated with the reference numeral 17. The tensile and compressive forces which occur in the lengthwise adjustable control rod 3 during the adjustment of a rotor blade in conformity with the movement or turbulence of the rising or returning rotor blade 1 are detected by a measuring device 18, which is equipped, for example, with an extensible bar, is converted into an electrical signal, and is transmitted to the control unit 2 in the control room of the helicopter, where it is indicated as a signal in the control device.

The present invention is, of course, in no way restricted to the specific disclosure of the specification and drawing, but also encompasses any modifications within the scope of the appended claims.

What we claim is:

1. An apparatus for adjusting the track of rotor blades through remote control, said apparatus comprising:
   a respective two-part, lengthwise adjustable control rod associated with each rotor blade;
   a control device, in the form of a potentiometer, and a measuring device installed in said control rod and operatively connected with an operating station which is provided with an indicator;
   a supply unit for control of said rotor blade;
   a servomotor associated with said unit and with said control rod; said unit including a receiving/transmitting part, and a source of energy for said servomotor, with said receiving/transmitting part and said source of energy being integrated into said control rod and being combined with said servomotor to form a structural unit; and
   a housing for accommodating said structural unit formed by said source of energy, said servomotor, and said receiving/transmitting part.

2. An apparatus according to claim 1, which includes a support plate for said servomotor, said support plate being axially displaceable in said housing, and being disposed at and end thereof; said source of energy and said receiving/transmitting part are mounted on said support plate.

* * * * *